United States Patent
Kang et al.

(10) Patent No.: US 7,036,315 B2
(45) Date of Patent: May 2, 2006

(54) APPARATUS AND METHOD FOR DETECTING LOW CHARGE OF WORKING FLUID IN A WASTE HEAT RECOVERY SYSTEM

(75) Inventors: Pengju Kang, Hartford, CT (US); Frederick James Cogswell, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 185 days.

(21) Appl. No.: 10/742,724

(22) Filed: Dec. 19, 2003

(65) Prior Publication Data

US 2005/0132704 A1 Jun. 23, 2005

(51) Int. Cl.
*F02G 1/00* (2006.01)

(52) U.S. Cl. ............... 60/653; 60/646; 60/652; 60/657; 62/129

(58) Field of Classification Search ............... 60/646, 60/652, 653, 657, 660, 670; 62/125, 129
See application file for complete search history.

(56) References Cited

U.S. PATENT DOCUMENTS

| | | | | |
|---|---|---|---|---|
| 3,630,022 A | * | 12/1971 | Jubb ........................... | 60/650 |
| 4,165,616 A | * | 8/1979 | Pierpoline ................... | 60/661 |
| 4,386,499 A | | 6/1983 | Raviv et al. ................. | 60/657 |
| 4,590,384 A | | 5/1986 | Bronicki ..................... | 290/4 C |
| 4,593,527 A | * | 6/1986 | Nakamoto et al. ............ | 60/660 |
| 4,617,808 A | | 10/1986 | Edwards ..................... | 62/472 |
| 4,760,705 A | | 8/1988 | Yogev et al. ................. | 60/651 |
| 4,876,854 A | * | 10/1989 | Owens ........................ | 60/652 |
| 4,901,531 A | | 2/1990 | Kubo et al. .................. | 60/618 |
| 5,038,567 A | | 8/1991 | Mortiz ....................... | 60/641.5 |
| 5,119,635 A | | 6/1992 | Harel ......................... | 60/692 |
| 5,339,632 A | | 8/1994 | McCrabb et al. ............. | 60/618 |
| 5,598,706 A | | 2/1997 | Bronicki et al. ............. | 60/641.2 |
| 5,632,143 A | | 5/1997 | Fisher et al. ................ | 60/39.182 |
| 5,640,842 A | | 6/1997 | Bronicki .................... | 60/39.181 |
| 5,664,419 A | | 9/1997 | Kaplan ....................... | 60/641.2 |
| 5,761,921 A | | 6/1998 | Hori et al. .................. | 62/238.4 |
| 5,809,782 A | | 9/1998 | Bronicki et al. ............. | 60/641.2 |
| 5,860,279 A | * | 1/1999 | Bronicki et al. ............. | 60/670 |
| 6,009,711 A | | 1/2000 | Kreiger et al. .............. | 60/641.2 |
| 6,101,813 A | | 8/2000 | Sami et al. ................... | 60/671 |
| 6,128,901 A | * | 10/2000 | Sha ........................... | 60/661 |
| 6,497,090 B1 | | 12/2002 | Bronicki et al. ............. | 60/651 |
| 6,539,718 B1 | | 4/2003 | Bronicki et al. ............. | 60/641.2 |
| 6,539,720 B1 | | 4/2003 | Rouse et al. ................. | 60/651 |
| 6,539,723 B1 | | 4/2003 | Bronicki et al. ............. | 60/774 |
| 6,571,548 B1 | | 6/2003 | Bronicki et al. ............. | 60/39.181 |
| 6,892,522 B1 | * | 5/2005 | Brasz et al. ................. | 60/39.181 |
| 2002/0148225 A1 | | 10/2002 | Lewis ........................ | 60/670 |

(Continued)

FOREIGN PATENT DOCUMENTS

DE 19630559 1/1998

(Continued)

*Primary Examiner*—Sheldon J Richter
(74) *Attorney, Agent, or Firm*—Wall Marjama & Bilinski LLP

(57) ABSTRACT

In a waste heat recovery system having a superheat controller, a reference superheat controller operating trajectory is established and compared with operational superheat controller trajectories from time to time and measuring the deviation therebetween to determine whether a low charge condition exists. If such a condition does exist, warning steps and possibly shut down steps can be taken. As a verification of a low charge condition, the absence or presence of oscillations in the pressure and/or pump power conditions can be observed.

14 Claims, 3 Drawing Sheets

U.S. PATENT DOCUMENTS

| | | | |
|---|---|---|---|
| 2003/0029169 A1 | 2/2003 | Hanna et al. | 60/651 |
| 2003/0089110 A1 | 5/2003 | Niikura et al. | 60/618 |
| 2003/0167769 A1 | 9/2003 | Bharathan et al. | 60/676 |

FOREIGN PATENT DOCUMENTS

| | | |
|---|---|---|
| DE | 19907512 | 8/2000 |
| DE | 10029732 | 1/2002 |
| EP | 1243758 | 9/2002 |
| JP | 52046244 | 4/1977 |
| JP | 54045419 | 4/1979 |
| JP | 54060634 | 5/1979 |
| JP | 55091711 | 7/1980 |
| JP | 58055409 | 5/1983 |
| JP | 58122308 | 7/1983 |
| JP | 59043928 | 3/1984 |
| JP | 59054712 | 3/1984 |
| JP | 59063310 | 4/1984 |
| JP | 59138707 | 8/1984 |
| JP | 59158303 | 8/1984 |
| JP | 60158561 | 8/1985 |
| JP | 06088523 | 3/1994 |
| JP | 2002266655 | 9/2002 |
| JP | 2002285805 | 10/2002 |
| JP | 2002285907 | 10/2002 |
| JP | 2003161101 | 6/2003 |
| JP | 2003161114 | 6/2003 |
| WO | 98/06791 | 2/1998 |
| WO | 02/099279 | 12/2002 |
| WO | 03/078800 | 9/2003 |

\* cited by examiner

APPARATUS AND METHOD FOR DETECTING LOW CHARGE OF WORKING FLUID IN A WASTE HEAT RECOVERY SYSTEM

BACKGROUND OF THE INVENTION

This invention relates generally to waste heat recovery systems and, more particularly, to a method and apparatus for detecting a low charge of working fluid therein.

As used herein, the term "waste heat recovery system" includes distributed power generation systems, such as organic rankine cycle power plants, which use a pump to transport the refrigerant in the system. A typical waste heat recovery system includes an evaporator, a turbine, a condenser, and a pump. The evaporator absorbs heat from heat source, which causes the refrigerant in the evaporator to boil off into a gaseous state. The refrigerant flows from the evaporator outlet to a turbine, in which the refrigerant is expanded to a low pressure condition. From the turbine the refrigerant circulates first to a condenser, where the refrigerant is cooled to a liquid state, and then to a pump, after which the pressure is raised. From the pump, the refrigerant circulates back to the evaporator, and the cycle is repeated. Efficient and safe operation of the system requires that proper refrigerant circulation and an appropriate refrigerant charge level be maintained.

In respect to the need for maintaining a proper refrigerant circulation at the proper conditions, a superheat controller can be applied to sense the various conditions of refrigerant passing through the turbine and to responsively vary the speed of the pump in order to maintain the desired refrigerant conditions. Those conditions include maximum pressure and temperature levels as well as a minimum superheat level.

Separate from the issue of maintaining proper refrigerant conditions is that of maintaining a proper refrigerant charge. A low refrigerant charge condition may result in the pump reaching its maximum operating speed, after which point the thermal dynamic loop is no longer in control thereby causing serious problems, such as damage to the turbine due to reduced cooling capability because of high superheat. The problems also include pump damage due to cavitations, reduction in plant efficiency, and reliability. In addition, low charge condition also means undesirable emission of refrigerant gases into the environment.

Most known low-charge detection systems have been developed for use in air conditioning systems. These systems use a combination of two or more temperature sensors, pressure switches, or pressure transducers. They tend to be particularly unreliable for the application in waste heat recovery systems.

SUMMARY OF THE INVENTION

Briefly, in accordance with one aspect of the invention, a baseline operating trajectory of a superheat controller is developed as a reference for comparison with periodic operating trajectories for purposes of determining the degree of deviation between the two, with the degree of deviation being an indication of a low charge of working fluid.

In accordance with another aspect of the invention, provision is made to take appropriate action, such as to provide a warning to the operator or a shutting down of the system, in response to a perceived low charge of working fluid.

By yet another aspect of the invention, in addition to the monitoring of deviation from the baseline operating trajectory, further steps are taken to verify the low charge working fluid condition. A monitoring of the pressure oscillations, and a further monitoring of the power oscillations of the variable speed pump motor, provide further indications as to whether or not a low charge of working fluid condition exists.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
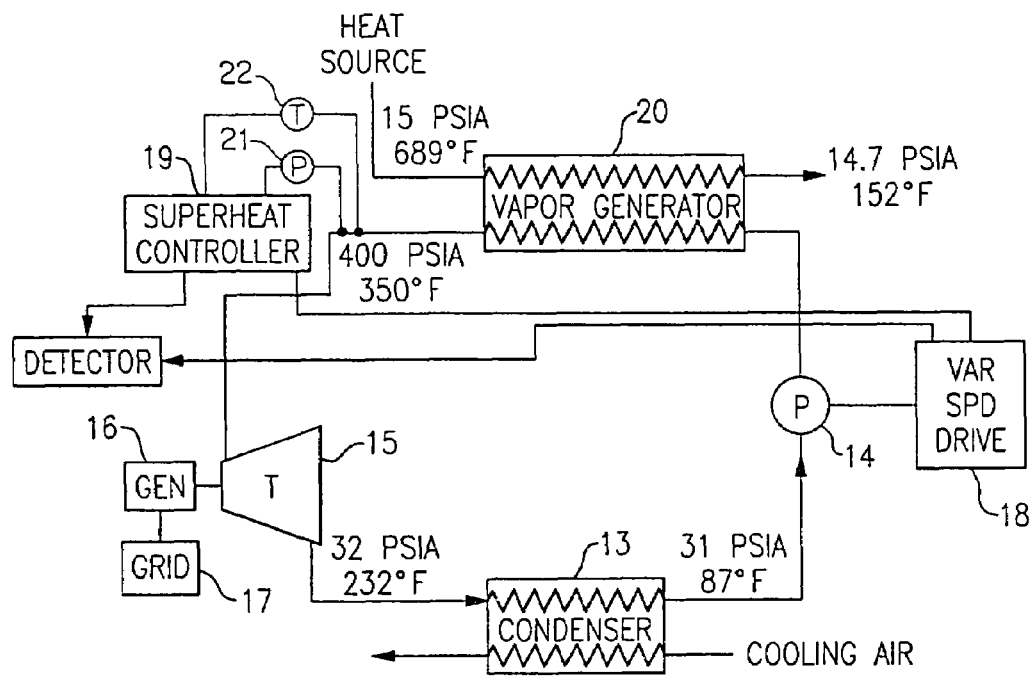
FIG. 1 is a schematic illustration of a waste heat recovery system with the low charge detecting system incorporated therein.

Referring now to FIG. 1, a waste heat recovery system is shown to include an organic rankine cycle (ORC) power plant that comprises, in serial flow relationship, a vapor generator 20, a turbine 15, a condenser 13, and a pump 14. The turbine 12 drives a generator 16 which generates power to be sent to a grid 17. The pump 14 is driven by a variable speed drive 18, with the speed thereof being controlled in a manner to be described more fully hereinafter.

Energy is provided to the ORC by way of the vapor generator 20, with the energy coming from a heat source which may otherwise transfer heat to the environment in the form of waste heat. An example of such a heat source is a mirco-turbine, with heat being given off at its exhaust and by its engine coolants. Typical pressures and temperatures are 15 psia and 689° F. for the fluid going into the vapor generator and 14.7 psia and 152° F. for the fluid being discharged from the vapor generator 20.

The working fluid being circulated in the ORC is a refrigerant, with a preferred refrigerant being R-245fa. Typical pressures and temperatures of a working fluid are shown to be 400 psia and 300° F. as it leaves the vapor generator, 32 psia and 232° F. as it leaves the turbine 15 and enters the condenser 13, and 31 psia and 87° F. as it leaves the condenser 13. The ORC is designed to operate with a desired amount of refrigerant charge, and if that amount is decreased, by leakage or the like, then the system will not operate properly and may result in damage to its components such as the pump or the turbine. The present invention addresses this problem as will described hereinafter.

In addition to the need for maintaining a sufficient charge of working fluid, it is also necessary to maintain a proper working condition of the refrigerant entering the turbine 15 in order to maintain desired efficiency and reliability. That is, the condition of the working fluid leaving the vapor generator 20 and entering the turbine 15 must meet the following criteria: 1) the maximum pressure limit must not be exceed, 2) the maximum temperature limit must not be exceed and 3) the superheat must not approach 0. In addition, the condition of the working fluid should be maintained in such a manner as to maintain a sufficiently high pressure in order to maximize the power efficiency of the system.

The superheat controller 19 is a feedback controller that regulates the superheat of the refrigerant leaving the vapor generator 20 to a fixed set point value. The controller 19 uses the measurements of a refrigerant pressure and the transducer 21 temperature sensor 22 leaving the evaporator to calculate the superheat according to the thermodynamic property of the working fluid. The calculated superheat is compared with the set point value, and the deviation between the calculated value and set point value is eliminated by the controller by adjusting the pump rotation speed. It is the operating characteristics of the superheat controller 19 which are used to detect a low charge condition in accordance with one embodiment of the present invention as will now be described.

Figure 2:
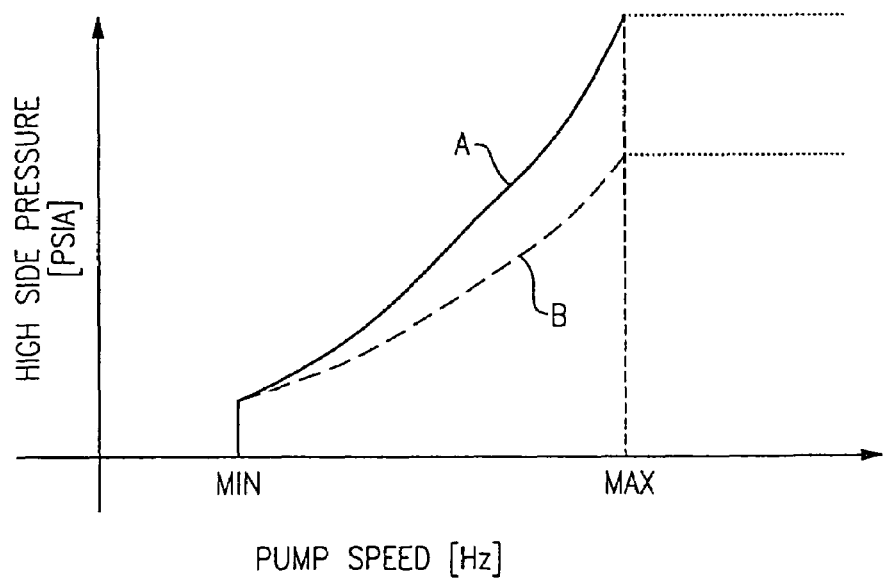
FIG. 2 is a graphic illustration of a pressure versus pump speed trajectory of the superheat controller showing both a baseline trajectory and an actual sensed trajectory.

Due to the control action of the superheat controller 19, there exists a well defined relationship between high side pressure and the pump rotational speed, when the charge of the working fluid is at a normal operational level. This relationship is shown in FIG. 2 and is referred to as the operating trajectory of the controller. That is, curve A is a baseline curve showing the associated high side pressures for various pump speeds when the system is operating in steady state operation with a full charge of refrigerant. This curve may be referred to as the operating trajectory or reference trajectory of the controller.

Curve B, on the other hand, shows reduced high side pressures that result from the refrigerant charge in the system being reduced to a level below the desired level. The difference between these two curves can be used as a basis for determining whether a low charge condition exist as will now be described.

Figure 3:
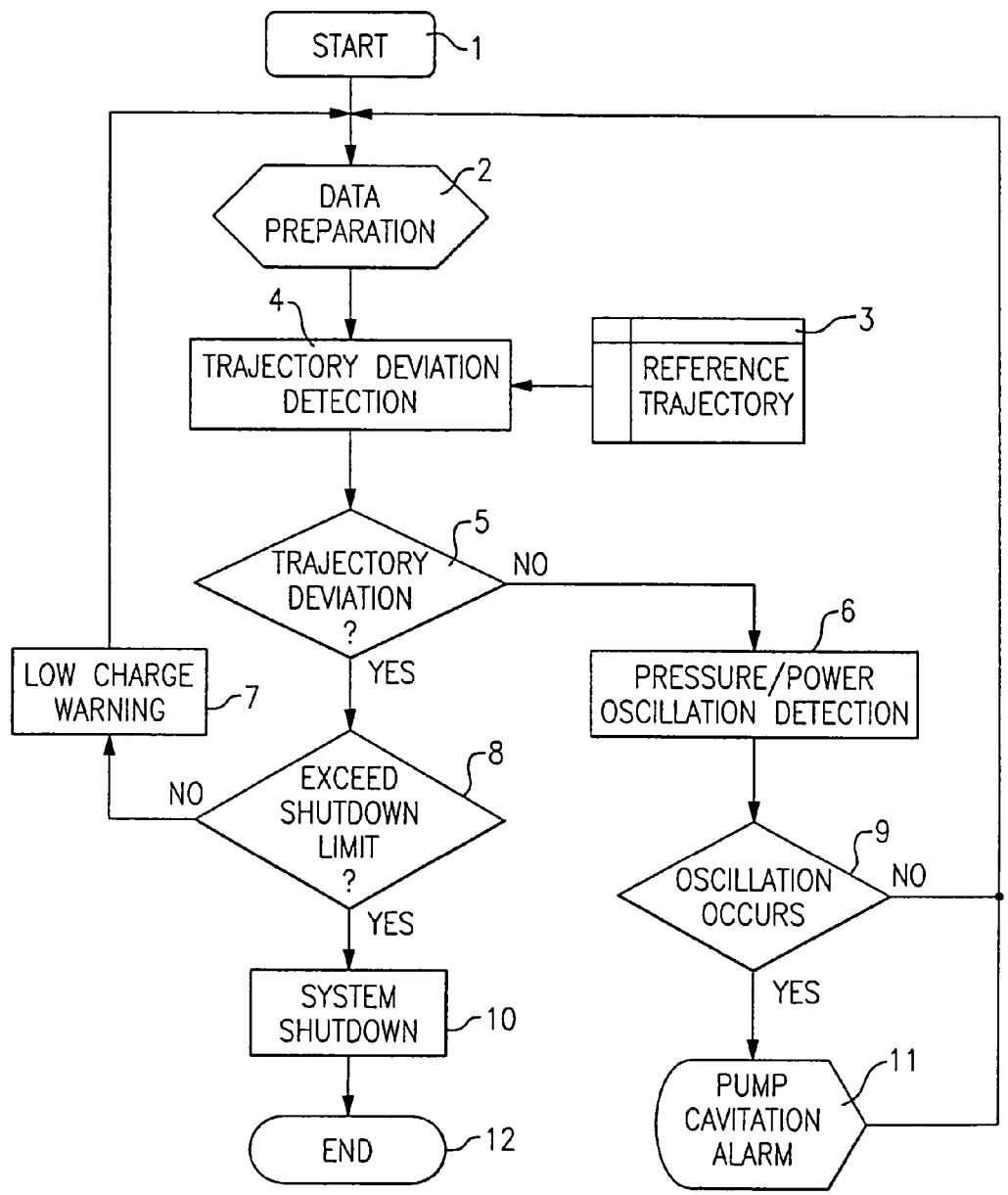
FIG. 3 is a flow chart indicating the process of low charge detection in accordance with the present invention.

Referring now to FIG. 3 a flowchart is provided to show the various steps in the process of determining whether there is a sufficient charge of working fluid in an ORC system.

In step 2, a window of data points are collected and prepared according to a predefined format. The data include pump rotation speed, high side working fluid pressure, and pump power. The high side pressure can be measured at the evaporator exit. The pressure and power data are arranged in accordance with the pump rotation speed.

In step 4, the prepared actual pressure data corresponding to different rotation speeds are compared with the pre-stored reference trajectory in step 3, which is a predefined relationship between the pump rotation speed in Hz and high side pressure in psia. This relationship defines the required speed at a certain value of high side system pressure.

In step 5, if deviation is detected between the actual trajectory and the reference trajectory the process is shifted to step 8, where the deviation is further evaluated against a limit. If the limit is exceeded, this indicates that a serious low charge condition has occurred, and the waste heat recovery system should be shut down immediately for safety reasons. After step 8, the process is directed to step 10, in which the system is safely shutdown.

If, in step 8, the deviation is considered not serious, this indicates that the low charge condition is not detrimental to the integrity of the waste heat recovery system. In this case, the process is taken to step 7, in which a warning signal is issued to the operator such that additional charge can be added without shutting down the entire system. After step 7, the process goes back to the start for continuation of the detection procedure.

In step 5, if the deviation is not detected, then, the process is directed to step 6, in which the pressure and power data are analyzed for any occurrence of high frequency signal contents such as persistent oscillations and spikes. If high frequency signal contents are detected, then the pump is likely undergoing cavitations. Serious pump cavitations are detrimental to the health of the pump, and stability of the system operation. Therefore the system master controller is notified such that remedy actions can be taken in time to stop the cavitations. After step 6, the process is led back to the start to continue the detection process.

Shown in FIG. 3 are three controller operating curves obtained from an experimental organic rankine cycle waste heat recovery power plant. Curve C is a reference trajectory, curve D is the actual curve corresponding to the full charge state, and curve E is the actual curve of low charge. The deviation is the difference between the actual operating trajectory (i.e. curve D) of the superheat controller when the charge is low as compared with the reference trajectory (i.e. curve C).

Figure 4:
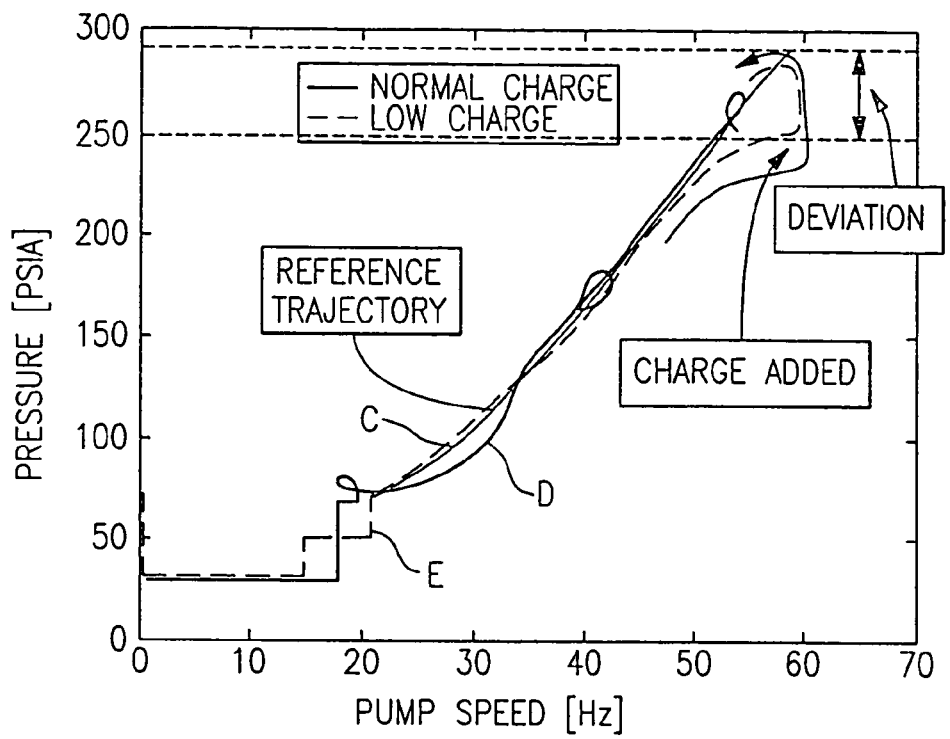
FIG. 4 is a graphic illustration of test results showing a comparison of the baseline trajectory and an actual trajectory for both normal charge and low charge conditions.
Figure 5:
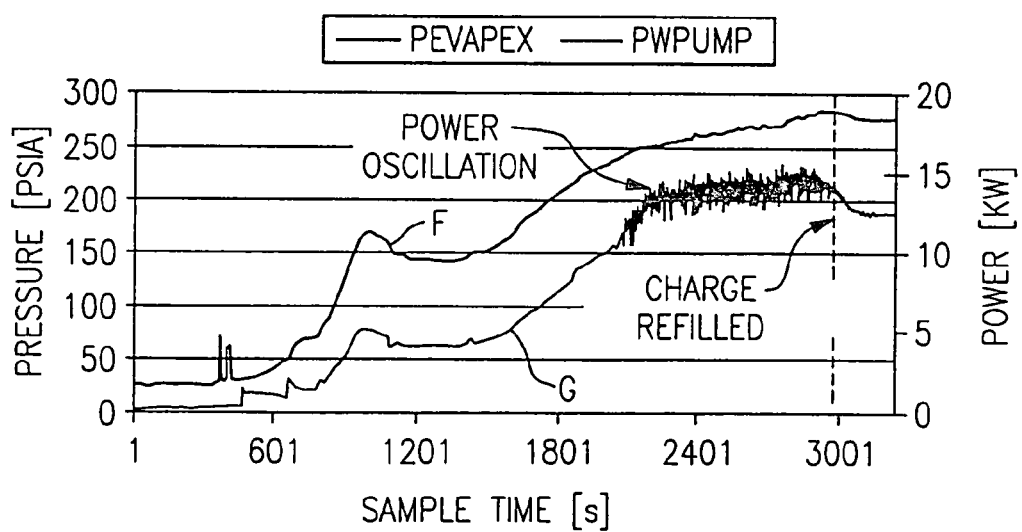
FIG. 5 is a graphic illustration of resultant pressure and pump power oscillations during low charge conditions.

FIG. 4 shows at curve F the vapor pressure at the evaporator exit and at curve G, the electrical power being used by the variable speed drive 18 which drives the pump 14. In the region near the designed operating pressure (280 psia), due to charge reduction in the system, minor pump cavitations start to occur. Pump cavitations are exhibited in the pump pressure or power as oscillations. As soon as the charge has been refilled (FIG. 3), the oscillation disappears, and the system pressure is driven back to a point on the reference trajectory. The reason that pressure at the evaporator exit does not show any oscillations when the system is operating at designed pressure is due to the damping effect of the evaporator.

Under low pressure conditions, the controller operating trajectory is not much different from the reference trajectory. This is because the reduced charge is able to sustain the requirement of low pressure system. However when the system pressure approaches the designed high pressure working condition, the controller trajectory starts to deviate away from the reference. As soon as the needed charge is refilled, the operating point is driven back to a point on the reference trajectory.

While the present invention has been particularly shown and described with reference to a preferred embodiment as illustrated in the drawings, it will be understood by one skilled in the art that various changes in detail may be effected therein without departing from the true sprit and scope of the invention as defined by the claims.

We claim:

1. A method of detecting a low charge of working fluid in a waste heat recovery system having in serial flow relationship an evaporator, a superheat controller, a condenser and a pump that is driven by a variable speed motor, comprising the steps of:

establishing a reference trajectory for the superheat controller;

determining an actual operational trajectory for the superheat controller at a time of operation of the waste heat recovery system;

comparing said reference trajectory with said actual operational trajectory to determine the deviation therebetween; and on the basis said deviation, determining whether there is a indication of a low charge in the system.

2. A method as set forth in claim 1 wherein said step of establishing a reference trajectory is accomplished by plotting refrigerant pressure at said superheat controller versus pump speed.

3. A method as set forth in claim 1 and including the further step of initiating a warning as a result of determining that there is an indication of a low charge in the system.

4. A method as set forth in claim 1 and including the further step of initiating a shut down of the system as a result of determining that there is an indication of low charge in the system.

5. A method as set forth in claim 1 and including the further step of determining whether there are oscillations in the pressure at said superheat controller, and determining whether these oscillations are indicative of a low charge condition.

6. A method as set forth in claim 1 and including the further step of determining whether there are oscillations in the power of the drive motor of the pump and further determining whether the oscillations are sufficient to indicate a low charge condition.

7. An apparatus for monitoring and detecting a low charge condition in a waste heat recovery system having an evaporator, a superheat controller, a turbine, a condenser and a pump driven by a variable speed motor comprising:

means for generating a reference trajectory for the superheat controller;

means for determining an actual operating trajectory for the superheat controller at a time of operation of the waste heat recovery system;

means for comparing said reference trajectory with said actual operating trajectory to determine the variation therebetween as an indication of a low charge condition of the system.

8. An apparatus as set forth in claim 7 wherein said reference trajectory generating means plots refrigerant pressure at said superheat controller versus pump speed.

9. An apparatus as set forth in claim 7 and including means for providing a warning to an operator when it has been determined that there is an indication of a low charge condition.

10. An apparatus as set forth in claim 7 and including means for shutting down the system when it has been determined that there is an indication of a low charge in the system.

11. An apparatus as set forth in claim 7 and including means for verifying said determination of an indication of a low charge condition.

12. An apparatus as set forth in claim 11 wherein said verification means includes means for determining whether there are oscillations in the pressure at said superheat controller.

13. An apparatus as set forth in claim 11 wherein said verification means includes means for determining whether there are oscillations in the power of the drive motor of the pump.

14. A method of determining the adequacy of the charge of working fluid in a waste heat recovery system having an evaporator, a condenser and a pump that is driven by a variable speed motor, comprising the steps of:

providing a superheat controller which controls the degree of superheat to the turbine by varying the speed of the variable speed motor;

establishing a reference trajectory for the superheat controller;

determining an actual operational trajectory for the superheat controller at a time of operation of the waste heat recovery system;

comparing said reference trajectory with said actual operation trajectory to determine the deviation therebetween; and on the basis of said deviation, determining whether there is an indication of a low charge of working fluid for this system.

* * * * *